United States Patent [19]
Laing

[11] 3,958,419
[45] May 25, 1976

[54] DRIVE ENGINE FOR MOTOR CAR ACCESSORY UNITS

[76] Inventor: Nikolaus Laing, Hofener Weg 35 bis 37, 7141 Aldingen near Stuttgart, Germany

[22] Filed: Nov. 26, 1973

[21] Appl. No.: 419,211

[30] Foreign Application Priority Data
Nov. 28, 1972 Austria .......................... 101109/72

[52] U.S. Cl. .............................. 60/397; 60/425; 60/468; 60/483
[51] Int. Cl.² ....................................... F15B 11/18
[58] Field of Search ............ 60/397, 425, 468, 483, 60/325, 327, 407, 427, 487; 418/210, 212, 213, 267; 91/492

[56] References Cited
UNITED STATES PATENTS

| | | | |
|---|---|---|---|
| 900,342 | 10/1908 | Ashley | 60/425 X |
| 1,244,686 | 10/1917 | Bamford | 60/397 |
| 1,349,924 | 8/1920 | Swanson | 60/483 |
| 1,834,368 | 12/1931 | Arbuckle | 60/397 |
| 2,163,079 | 6/1939 | Benedek | 60/425 |
| 2,374,588 | 4/1945 | Doran | 60/425 |
| 3,180,079 | 4/1965 | Freeman | 60/397 X |
| 3,582,245 | 6/1971 | Wallace | 418/210 |
| 3,828,555 | 8/1974 | Capdevielle | 60/483 |

*Primary Examiner*—Edgar W. Geoghegan
*Attorney, Agent, or Firm*—Pennie & Edmonds

[57] ABSTRACT

A driving device for accessory units in motor cars, e.g. an air conditioning appliance, which comprises an expansion engine which is located in the induction pipe of the internal combustion engine. The expansion engine is powered by flow of air in the induction pipe and the expansion engine serves as a throttling device for the induction pipe.

7 Claims, 8 Drawing Figures

DRIVE ENGINE FOR MOTOR CAR ACCESSORY UNITS

THE PRIOR ART

Hydraulic transmission pumps, fans, as well as, in particular, compressors for air conditioning appliances, in motor vehicles are driven by V-belts from the engine crankshaft at a constant speed-ratio. This type of drive has disadvantages because the speed range of the crankshaft between idling and fast travel is about 1:10. In addition, the design parameters of the accessory units, both in size and power absorption, are determined by the need to ensure that most of these units deliver their full power when the car engine is running slowly, and some of them even at idling speed. This is particularly true of refrigeration compressors because, at slow travelling speed, it is difficult to cool the cabin of a motor car containing the occupants by the relative wind caused by movement of the motor car either.

It is desirable that some auxiliary appliances, for example a refrigerator compressor and a radiator cooling fan, be disengaged and reengaged at will. Thus when a motor car is travelling fast, adequate cooling may be obtained by the relative wind resulting from movement of the motor car such that it is not necessary to engage a compressor or radiator cooling fan whereas at low speed, it may be desirable to engage a compressor and cooling fan to provide an induced movement of cooling air by the fan. Such accessory units, therefore, demand additional clutches which, in turn, entail a substantial manufacturing cost and, since they are usually designed as electrical clutches, consume appreciable electrical power.

OBJECT OF THE INVENTION

The aim of the invention is an arrangement in which accessory units can be driven at speeds largely independent of the crankshaft speed.

DESCRIPTION OF THE INVENTION

According to the invention, when the accessory units are operated, the induction air of the engine is throttled by an expansion engine instead of a throttle valve. At idling, a suction pressure of 6,000 to 8,000 mm water column prevails in the induction manifold of an internal combustion engine. This suction pressure diminishes with the opening of the throttle valve and, a full engine speed, amounts to only about 500 mm water column. The induction air flow increases with diminishing pressure drop across the throttle valve. At idling, the induced quantity of air is relatively small; at full load, it is about 10 to 20 times larger. The product of suction pressure and induced air flow remain within narrow limits.

The invention provides for replacement of the throttle valve by an expansion engine and ensures that the pressure reduction of the air at the inlet to the induction manifold takes place through the expansion engine. The energy, which is otherwise lost through eddies behind the throttle valve, is thus transferred to the expansion engine which is thereby enabled to drive accessory units. In an internal combustion engine for a vehicle, the use of such an expansion engine has the advantage that the energy of the eddies, which heats up the induction air, is absent whilst the power output of the expansion engine is derived from the gas cycle of the internal combustion engine. Expansion engines under consideration have an expansion ratio which can be varied. However, air turbines are also suitable, particularly where the pitch angle of the rotor or stator blades can be matched to the suction pressure in the induction manifold. A series arrangement of at least two expansion engines has been found to be most favourable. One of these engines is designed for a very large partial pressure ratio, e.g. for a pressure ratio of 1:3 or even 1:5, with a small volume throughflow whilst all other engines are designed for much smaller pressure ratios but with larger volume flows. Two or more such engines may also drive a single shaft and as this construction is utilized, an overrunning clutch is provided between the rotor of each of these engines and the driven shaft. The clutch secures an engagement when the rotor rotates faster than the shaft. By this arrangement, the operation of all expansion engines in every operating state is avoided and the best-matched expansion engine is maintained in driving engagement. The induction air supply to all other engines is shut off by a sleeve valve. The entire driving device can be stopped by means of bypass throttle valves. Thus, it becomes possible to stop, for example, refrigeration compressors when they are not needed and to start them up again during a journey. The driven units themselves become much smaller than hitherto. Until now, a refrigeration compressor had to be so designed that it delivered the full refrigeration performance at an engine speed of 1,000 rpm. At the highest crankshaft speed the compressor absorbs, therefore, about six times the power from the shaft. This situation is a drawback which is of special significance in small motor car engines. In the present case, however the refrigeration compressor can be designed for a constant speed and thus absorb the same power in all vehicle operating states. This power, furthermore, is not lost to the crankshaft, but, on the contrary, owing to the reduced heating up of the induction air, the combination of an internal combustion engine with an expansion engine according to the invention increases the power output. Since the dimensions of expansion engines according to the invention are smaller the higher the rotational speed, the invention envisages as a rule systems with very high speeds. High-speed systems offer the advantage that, not only are the expansion engines themselves less costly, but also the driven equipment is less costly.

For example, refrigeration compressors can be designed with 1/12 of the swept volume of motor car refrigeration compressors used hitherto. Thus, the compressor becomes extremely inexpensive. Finally, owing to their small torque, compressors with such high speeds can be driven through magnetic transmission devices. The invention provides, therefore, the interposition of a magnetic transmission coupling for refrigeration compressors. In this manner, it becomes possible to seal the compressor hermetically in an enclosure with respect to the crankshaft. A further significant shortcoming of all air conditioning plants in motor cars is eliminated, namely the continuous escape of refrigerant through the shaft seal.

The invention is explained by way of example, with the help of figures.

FIG. 2a is an enlargement of the circled portion of FIG. 2;

Figure 1:
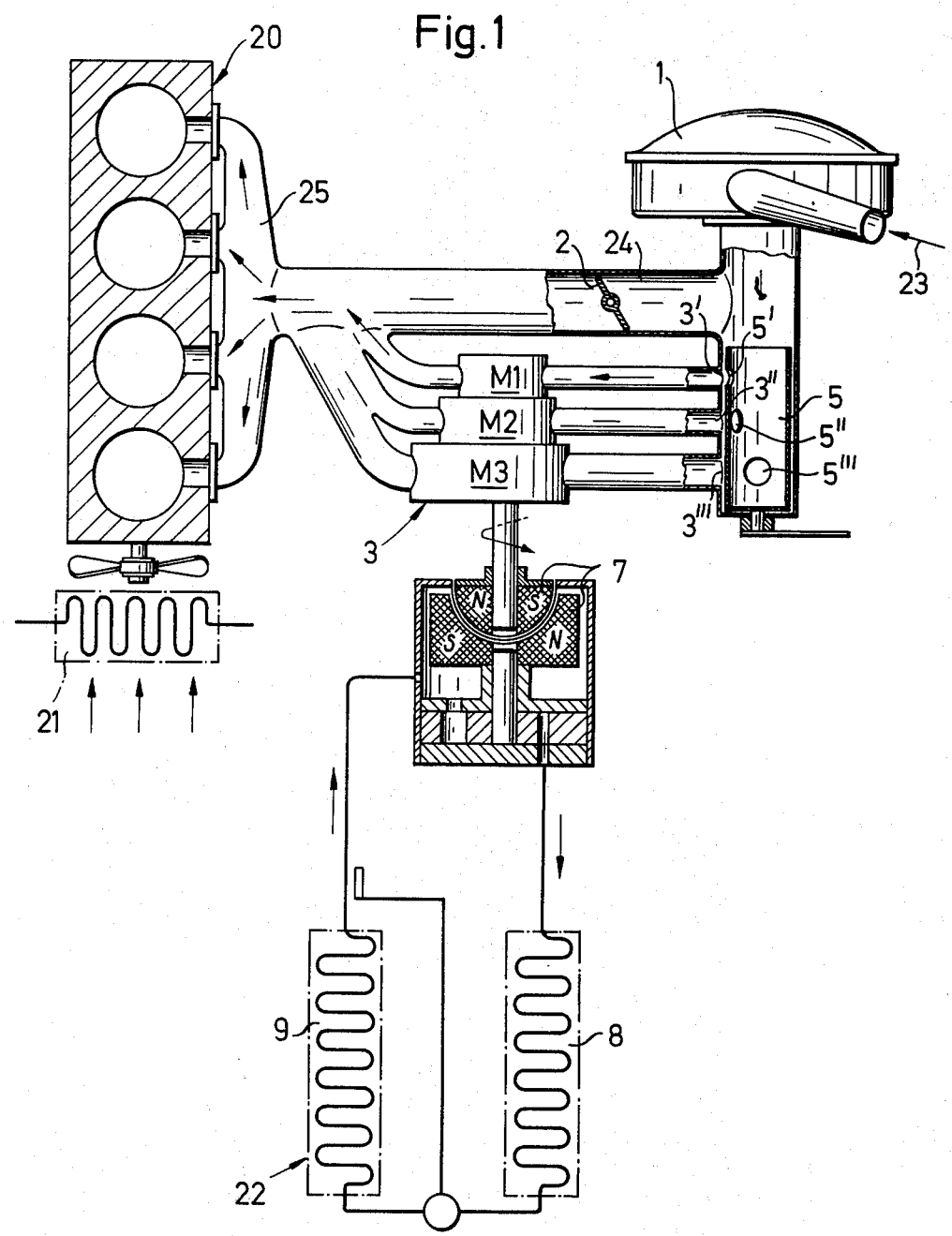
FIG. 1 shows, diagrammatically, and in partial cross-section the construction of a device according to the invention which can subsequently be installed in a motor vehicle.

In FIG. 1, an air filter 1, an internal combustion engine 20 with four cylinders, a water radiator 21 traversed by an air flow, a driving device or expansion engine 3 according to the invention and an accessory unit 22, which is driven by the expansion engine, are shown diagrammatically. When the accessory unit is not in operation, the air 23 induced via the air filter 1 flows through the duct 24 into the induction manifold 25 of the engine 20. The air flow is, in this case, controlled by the throttle valve 2.

When an accessory unit, in this case, the refrigeration compressor, is to be started up, the induction air 23, is fed to the expansion engine 3 whilst the throttle valve is shut. The three stages M1, M2 and M3 of this expansion engine are always supplied with air in the optimum manner as a function of the car engine power or of the position of the accelerator pedal 4, respectively. A rotary sleeve valve 5, which is coupled to the accelerator pedal, determines to which of the three stages M1, M2 or M3 of the expansion engine air should be admitted. Two expansion engine stages can operate simultaneously only in an overlap interval. The rotors 6 (see FIG. 6) of the individual stages which do not receive air do not rotate because they are equipped with an overrunning clutch.

Figure 3:
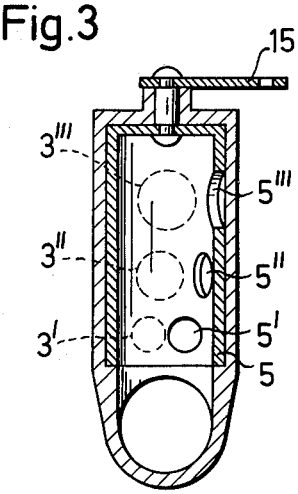
FIG. 3 shows a cross-section through the rotary sleeve valve of the device shown in FIG. 1.

The rotary sleeve valve 5, shown diagrammatically in FIG. 1, will be explained with the help of the illustrations in FIGS. 3 and 4. The actuating lever 15 of the rotary sleeve valve 5 is moved by the accelerator pedal and rotates sleeve this valve. According to the position of this rotary valve, when the accessory unit 22 is to be operated, one of the apertures 5', 5" or 5''' of the rotary sleeve valve fully overlaps one of the inlet ports 3', 3" or 3''' of the expansion engine stages M1, M2 and M3, so that induction air flows into the respective expansion engine stage and drives this expansion engine. When refrigeration performance is not required, the rotary sleeve valve 5 is so positioned that it shuts all three inlet ports 3', 3" and 3". The shaft power of the stages M1, M2 and M3 of the expansion engine is transmitted to the refrigerator 22 via a coupling, e.g. a magnetic coupling 7. Only the condenser 8 and the evaporator 9 of the refrigerator compressor are shown. The condenser 8 of the refrigeration compressor can be installed in front of the water radiator of the motor car engine, where it receives the optimum supply of air. The evaporator output which is equal to the refrigeration performance is supplied to the cabin for cooling the occupants of the motor vehicle. The refrigeration power absorption of the appliance, contrary to all conventional motor vehicle air conditioning appliances, is not branched off the car engine power but is derived from the induction air. Contrary to the adiabatic throttling used hitherto, which is associated with losses, this air is expanded isotropically in the stages of the expansion engine and generates power.

Figure 2:
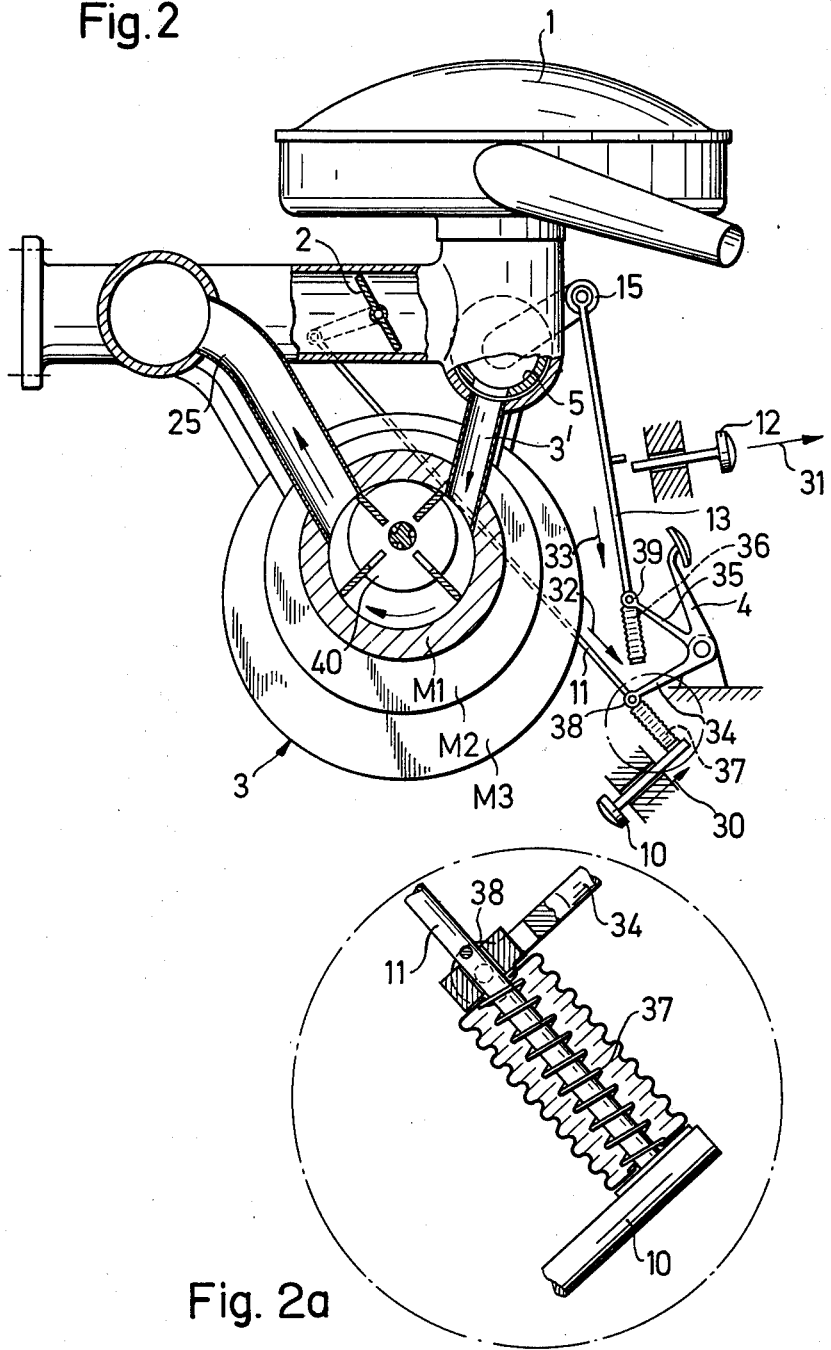
FIG. 2 shows diagrammatically and in partial cross-section various of the functional parts which are used in a device according to FIG. 1.

FIG. 2 gives a graphic illustration of the operation of the expansion engine as a function of the position of the accelerator pedal 4. When the accessory unit 22 is to be engaged, the buttom 10 is pushed home by a cable transmission in the direction of the arrow 30 and, simultaneously, the button 12 is pulled out in the direction of the arrow 31. The point at which the cable transmission is actuated is not shown. In this way, the motion of the rod 11, which determines the position of the throttle valve 2, is blocked in the direction of the arrow 32. However the motion of the rod 13 which is joined to the actuating lever 15 is released in the direction of the arrow 33. The freedom of motion of the lever arm 34 or 35 of the accelerating pedal with respect to the rods 11 or 13, each of which may be locked by the corresponding button 10 or 12, is ensured by a spring 36 or 37. Each spring is attached to the end of its respective rod and can be compressed by the respective lug 38 or 39 of the lever arm 34 or 35 against the spring force along the respective rod. Thus, according to the position of the buttons 10 and 12, only one rod 11 or 13 is free to move at any one time, i.e. either the rotary sleeve valve 5 or the throttle valve 2 can be rotated. When the rotary sleeve valve 5 is actuated in response to the accelerator pedal position, depending on the car engine power and the induction air flow, the corresponding stage M1, M2 and M3 of the expansion engine is actuated. The air flows into the expansion engine via one of the ducts 3', 3" or 3''' so that the rotor 40' rotates. The expanded air then flows through a duct to the induction duct 25 of the internal combustion engine.

When the air conditioning appliance 22 is to be stopped, i.e. when refrigeration performance is not required, the button 12 is pressed home opposite the direction of the arrow 31 so that the rod 13 is locked and the button 10 is pulled out opposite the direction of the arrow 30 so that it releases the rod 11 and permits the rotation of the throttle valve 2. The throttle valve 2 is then actuated via the rod 11 in the normal way by the accelerator pedal.

In idling, when the air conditioning appliance 22 is started up, the first aperture 5' of the rotary sleeve valve 5 is bought into full overlap with the inlet 3' of the first expansion engine stage M1 by pressing home the button 10 by means of a device not shown in the drawing. According to the condition of travel, air is admitted to the other expansion engine stages M2 and M3 by rotating the rotary sleeve valve 5.

Figure 4:
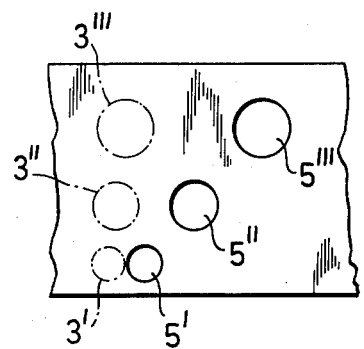
FIG. 4 shows the development of the apertures of the rotary sleeve valve shown in FIG. 3.

In FIG. 4, the developed rotary sleeve valve 5 is shown with the arrangement of the apertures 5', 5" and 5'''. These apertures are so arranged that, during full admission to one expansion engine, the inlet ports of the two other engines are shut off.

Figure 5:
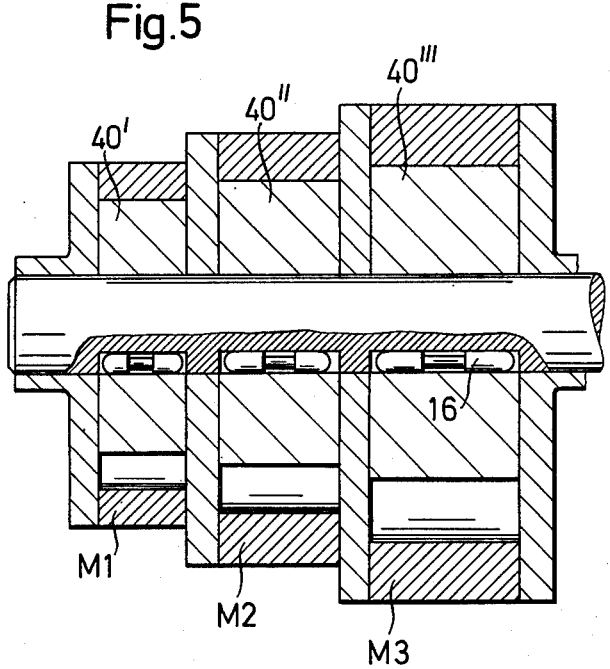
FIG. 5 shows a cross-section through the three stages of the expansion engine of the embodiment according to FIG. 1.

FIG. 5 shows a cross-section through the expansion engine stages M1, M2 and M3 with the rotors 40', 40" and 40'''.

Figure 6:
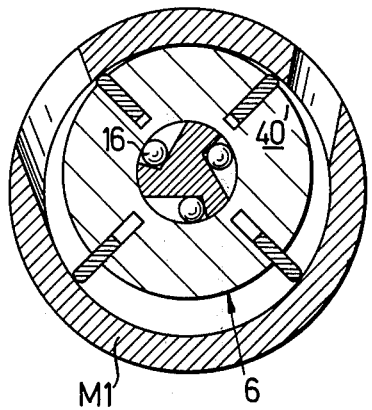
FIG. 6 shows a cross-section through a stage of the expansion engine at right angles to its axis and FIG. 7 shows a further embodiment of a device according to the invention.

In FIG. 6, a cross-section through the stage M1 is shown. As can be seen in FIGS. 5 and 6, the rotors of an expansion engine without air admission do not rotate because each rotor is equipped with an overrunning clutch 16. By this means, wear is substantially reduced and the power output of the expansion engine is increased.

Figure 7:
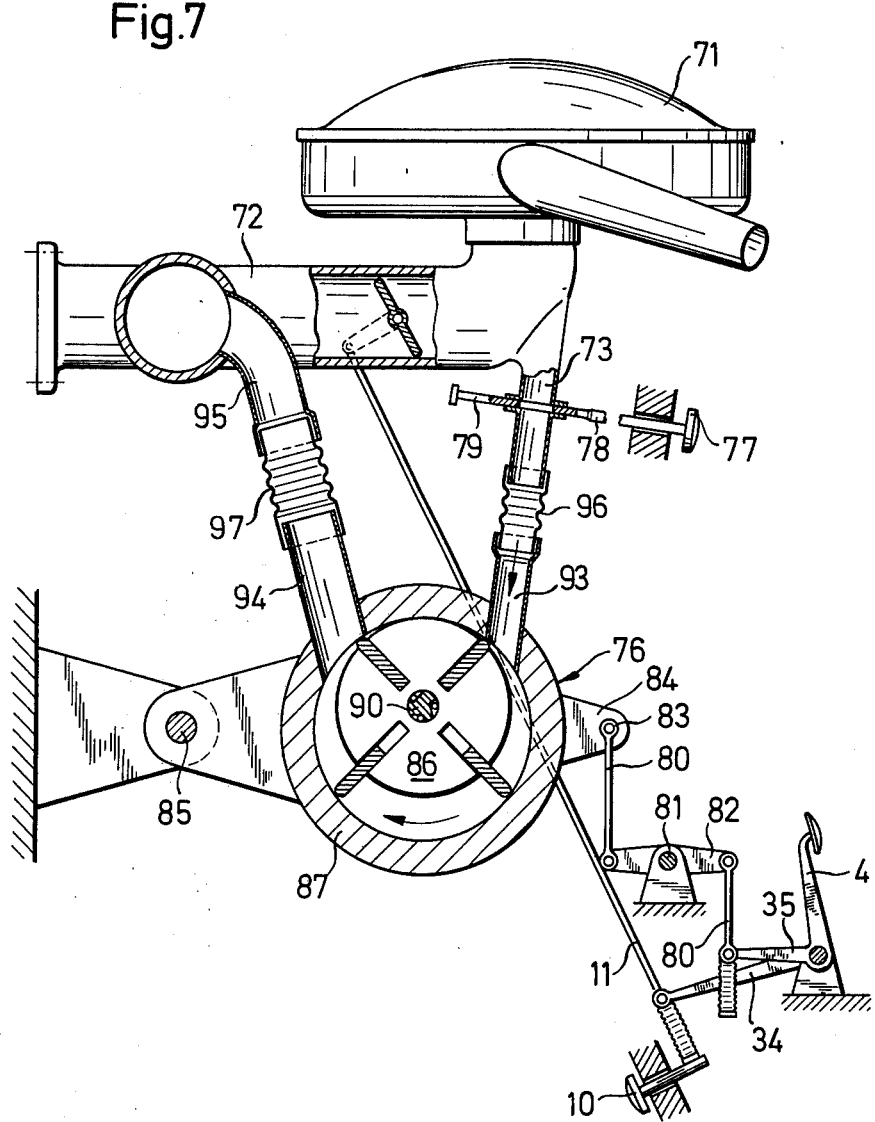

In FIG. 7 an arrangement with an air filter 71, an induction duct 72, a bypass 73 and a single-stage expansion engine 76 is shown. The button 10, the rod 11, the accelerator pedal 4 and the lever arms 34 and 35 of the accelerator pedal are constructed in the same way as in the arrangement according to FIG. 2 and fulfill the same functions. The connection and diconnection of the bypass is accomplished by the button 77, connected through a rod 78 to a gate valve 79, which opens or shuts the bypass 73 depending on whether the expansion engine 76 is to be operated or not. If the expansion engine 76 is to be started up, the engine casing 87 is rocked about the pivot 85 by the pedal 4, via the lever 35, the rod 80, which can be displaced by means of a lever 82 fulcrumed at point 81 and which is pivoted at the point 83 to a lug 84 of the expansion engine 76, so that the eccentricity of the rotor 86 in relation to the casing 87 can be varied and thus vary the compression performance or the expansion ratio of the expansion engine. It is emphasized that, in the embodiment as illustrated it is the rotor 86 which is arranged with its axis 90, fixed in space and it is the casing 87 which can be displaced in relation to the car engine about the pivot 85 in order to vary the eccentricity. The largest eccentricity, which corresponds to the position illustrated in FIG. 7, is selected at low rotational speeds of the internal combustion engine whilst, at high rotational speeds, the eccentricity, and thus the expansion ratio, is reduced when pressing the accelerator pedal 4. The freedom of the expansion engine inlet socket 93 and the discharge socket 94 to move in relation to the bypass 73 and the car engine induction pipe 95 is ensured by flexible elements 96 and 97 which are inserted into the ducts as illustrated in FIG. 7.

I claim:

1. An auxiliary driving device for driving units auxiliary to an internal combustion engine having an induction duct, comprising an expansion engine located in the induction duct of said internal combustion engine and driven by air passing through said induction duct whereby said expansion engine acts as a throttling device in said induction duct, and at least one bypass duct having a throttling device therein which duct bypasses said expansion engine whereby air may enter into the internal combustion engine when said expansion engine is not operating.

2. An auxiliary driving device according to claim 1 wherein said expansion engine comprises an air turbine.

3. An auxiliary driving device according to claim 1 wherein said expansion engine comprises a sliding vane-type displacement engine having a casing and a rotor eccentrically mounted in said casing and carrying said vanes.

4. An auxiliary driving device according to claim 3 wherein said expansion engine has a plurality of expansion stages of different expansion ratios and swept volumes each having a rotor therein and where said stages are adapted to be transversed by air passing through said duct, and said device has in addition control means for controlling flow of air to each said stage.

5. An auxiliary driving device according to claim 4 wherein said control means successively connects stages of diminishing expansion ratios with induction air in response to an accelerator pedal position.

6. An auxiliary driving device according to claim 4 wherein the rotors in the stages are all concentric with a common drive shaft.

7. An auxiliary driving device according to claim 6 having in addition an overrunning clutch associated with each rotor for selectively connecting a rotor to said common drive shaft whereby only the fastest rotating rotor will be drivingly connected to said shaft.

* * * * *